(12) United States Patent
Carrasco Schmidt (10) Patent No.: US 12,222,692 B2
(45) Date of Patent: Feb. 11, 2025

(54) EQUIPMENT, SYSTEM AND METHOD FOR OPTIMALLY MANAGING ENERGY IN A NETWORK FOR DOMESTIC AND INDUSTRIAL USE

(71) Applicant: UNIVERSIDAD ADOLFO IBAÑEZ, Peñalolen Santiago (CL)

(72) Inventor: Rodrigo Carrasco Schmidt, Las Condes Santiago (CL)

(73) Assignee: UNIVERSIDAD ADOLFO IBAÑEZ, Santiago (CL)

( * ) Notice: Subject to any disclaimer, the term of this patent is extended or adjusted under 35 U.S.C. 154(b) by 541 days.

(21) Appl. No.: 17/602,660

(22) PCT Filed: Mar. 26, 2020

(86) PCT No.: PCT/CL2020/050029
§ 371 (c)(1),
(2) Date: Oct. 8, 2021

(87) PCT Pub. No.: WO2020/206565
PCT Pub. Date: Oct. 15, 2020

(65) Prior Publication Data
US 2022/0179381 A1    Jun. 9, 2022

(30) Foreign Application Priority Data

Apr. 8, 2019  (CL) .................................. 0938-2019

(51) Int. Cl.
*G05B 19/042*     (2006.01)
(52) U.S. Cl.
CPC .... *G05B 19/042* (2013.01); *G05B 2219/2639* (2013.01)

(58) Field of Classification Search
CPC ................... G06Q 10/04; G05B 15/02; G05B 2219/2642; G05B 13/048; G05B 13/026;
(Continued)

(56) References Cited

U.S. PATENT DOCUMENTS 9,772,643 B2     9/2017  Steven et al.
10,187,402 B2 *  1/2019  Beals .................... H04L 67/535
(Continued)

FOREIGN PATENT DOCUMENTS

JP         5278462 B2      9/2013
WO       2019005412 A1     1/2019

OTHER PUBLICATIONS

International Search Report for related International Application No. PCT/CL2020/050029; report dated Oct. 15, 2020; (9 pages).
(Continued)

*Primary Examiner* — Darrin D Dunn
(74) *Attorney, Agent, or Firm* — K&L Gates LLP (57) ABSTRACT

The present disclosure is directed to energy management equipment configured to manage energy efficiently in a grid in a simple, economic, maintenance-free manner that can be easily used in residential and industrial applications. In addition, an energy system is proposed in a grid for home or industrial use that comprises a source of energy consumption, a main energy grid, an intermittent energy source, a secondary source of energy generation and an energy storage device. Finally, a method is proposed to manage energy by means of an optimization model that is executed in the equipment and energy management system of the present disclosure.

19 Claims, 6 Drawing Sheets

(58) Field of Classification Search
CPC .............. G05B 13/0265; G05B 19/042; G05B 2219/2639; H02J 3/003; H02J 2300/24; H02J 3/381; H02J 3/004; H02J 2300/20; H02J 2300/22; H02J 2300/28; H02J 3/46; H02J 3/466; H02J 3/144; H02J 3/24; Y02B 70/3225; Y02B 70/30; Y02B 10/10; Y02B 20/40

See application file for complete search history.

(56) References Cited

U.S. PATENT DOCUMENTS

| | | | |
|---|---|---|---|
| 10,223,656 B2 | 3/2019 | Kopp | |
| 2014/0129040 A1* | 5/2014 | Emadi | G06Q 50/06 700/291 |
| 2014/0200723 A1* | 7/2014 | Roy | H02J 3/46 700/291 |
| 2014/0257584 A1* | 9/2014 | Tanimoto | H02J 7/35 700/291 |
| 2018/0054070 A1 | 2/2018 | Krishnamoorthy et al. | |
| 2019/0036340 A1* | 1/2019 | Meeker | H02J 3/007 |

OTHER PUBLICATIONS

Written Opinion for related International Application No. PCT/CL2020/050029; report dated Oct. 15, 2020; (21 pages).

* cited by examiner

EQUIPMENT, SYSTEM AND METHOD FOR OPTIMALLY MANAGING ENERGY IN A NETWORK FOR DOMESTIC AND INDUSTRIAL USE

CROSS-REFERENCE TO RELATED APPLICATIONS

This application is the National Stage filing under 35 U.S.C. 371 of International Application No. PCT/CL2020/050029, filed on Mar. 26, 2020, which claims the benefit of earlier filing date and right of priority to Chile utility model Application No. 0938-2019 filed on Apr. 8, 2019, the contents of which are all hereby incorporated by reference herein in their entirety.

FIELD

The present invention is focused on solutions to optimally manage electrical energy in a grid with mainly residential and industrial applications, when there is the possibility of energy storage.

BACKGROUND

The use of renewable energy for the production of electricity is increasingly popular due to the economic and environmental benefit given the increasing price of fossil fuels and their negative effect on our ecosystem. The most common resources used today are wind, solar energy, and biomass, all of which have shown a steady increase in use.

In this sense, the growing interest in integrating renewable energy sources into the grid presents several important challenges from the point of view of reliability and control especially with those of an intermittent or variable nature as for example in the case of photovoltaic (PV), wind power generation, etc.

Due to its inherent variability the user generally has a surplus or deficit of energy. If there are no storage capacities the decision policy is simple, if there is a surplus (and it can be sold to the grid) the user sells while if there is a deficit the user must buy from the grid to match the current charge. But when there are storage capacities it is a non-trivial decision, since the decision of when to store, when to sell, whether to use the energy from the grid or from the storage system, must be taken. These are just some of the questions that the user is interested on answering.

Energy storage allows the large-scale integration of intermittent sources which favors that the penetration of distributed generation technologies increases at a reasonable economic and environmental cost. However, despite its benefits, energy storage has not been fully utilized so far. Limiting factors include, in addition to the rapidly decreasing cost, the lack of efficient control and management strategies. Currently and as mentioned above, storage systems work with simple user energy management strategies, if there is a surplus of energy it is stored while if there is a deficit it first uses the stored energy and then the grid. Therefore, solar generation forecasts or other factors such as energy prices or charge profiles are not always considered in this policy.

There is also considerable interest in the field of battery storage in combination with distributed generation to allow consumers to achieve even higher levels of independence from the main electrical grid. The major challenge in the adoption and greater penetration of many renewable resources is the uncertainty in power generation and the difficulty in predicting future generation, the variation in local demand and changes in energy prices depending on the time of purchase. All these factors must be taken into account in the design and implementation of grids for home and industrial use.

A microgrid is an active distribution grid that intelligently integrates generators and consumers to deliver electricity in an efficient and accessible manner. Solar panels or generators, the demand for energy, energy storage devices and a main grid are elements that can be in this microgrid, allowing generation, connection to energy storage systems (ESSs), consumption and power distribution.

In this sense, microgrids are used to improve the efficiency, sustainability, flexibility, reliability and security of the electrical system by allowing the grid to be observable, controllable, automated and fully integrated. It also provides the system with the ability to operate autonomously when there is a power outage in the main grid.

The configuration of a microgrid can be generally grouped into 3 types: DC (direct current) coupled, AC (alternating current) coupled and AC and DC coupled configurations wherein the technology of high voltage DC (HVDC for its acronym) has become more popular than AC technology for power transmission due to the advantages it offers such as high power density, controlled emergency support, no short-circuit level contribution and more stability.

Since the technology in renewable resources has evolved rapidly, so does the literature related to its optimal use. The overall goal is to find an optimal operating program that minimizes cost and optimizes the use of energy resources. On the other hand, the response to demand is usually a fare or a specific program to motivate end users or consumers to respond to changes in the price or availability of electricity over time, modifying their normal patterns of electricity use. The main objective is to obtain the optimal response to demand which has grown rapidly in popularity, as well as the number of organizations offering response programs to demand.

For example, the publication "Innovative Reactive Energy Management for a Photovoltaic Battery System" by Michael Böttiger et al., teaches an energy management system based on optimization models for a photovoltaic battery system connected to the AC grid. The energy management consists of a prediction module, an optimization module and a reactive management module. It is proposed to combine the results of the dynamic programming algorithm with a simple rule-based strategy. In addition, the results of a SOC start and start/end time sensitivity analysis are analyzed with respect to performance criteria, self-sufficiency, self-consumption, grid relief actor, economic parameter, full battery cycles and a specific value of the battery voltage.

On the other hand, document US 2006/027638 discloses methods and systems to optimize the control of energy supply and demand. A power control unit includes one or more algorithms for programming the control of power consuming devices based on variables related to power supply and demand forecasts. Devices for which power consumption can be programmed or deferred are activated during the most economical power consumption periods. The battery storage and alternative energy sources (for example, photovoltaic cells) are activated to sell power to the electrical grid during periods that are determined to correspond to favorable cost conditions.

Similarly, the publication "Power Management Strategy Based on Weather Prediction for Hybrid Stand-Alone System" by Menad Dahmane et al., proposes a management strategy to regulate the flow of energy between the generated and consumed powers of a self-contained wind/solar/battery system to satisfy the charge (a family home). The strategy considers a wind generator and a photovoltaic panel as the main energy sources and a battery bank as the storage system. For the emergency power source, it uses a diesel engine as an additional source. The optimal management strategy is to generate energy references for each subsystem. Then and based on the prediction of weather conditions, these power references are generated taking into account some restrictions related to the reliability of each subsystem.

The solutions mentioned above, use prediction systems and/or modules that based on data measured in real time, generate forecasts of the future energy that the renewable energy source will be able to generate and the amount of energy that the system controlled by the micro grid will demand. Such predictions make it possible to generate energy generation and demand profiles or curves that feed data to the predictive model that performs the optimization process.

The microgrids that use these predictive systems have the disadvantage that they require a high computing capacity to process the data and generate prediction profiles, as well as a large storage capacity to save the data obtained and subsequently processing them. For such purposes, a complex and expensive equipment is required, the operation of which also requires allocating a considerable part of the demanded energy, which many times makes that the energy management carried out by the microgrid is not sufficiently efficient.

These conditions also require a large investment in processing and storage equipment, the high cost of which means that the systems proposed by the state of the art cannot have an application in home solutions due to the low profitability it generates for the user.

In this scenario, the inventors have discovered and proven that the solar radiation data does not fluctuate significantly in time for geographic regions with discrete seasons of the year, therefore the use of historical solar radiation data for a certain locality turn out to be reliable enough to construct radiation curves or profiles that can be used in previously configured and programmable optimization models, so that it is possible to dispense with the processing, storage and cost intensive predictive systems proposed in the state of the art.

It is therefore the objective of the present invention to overcome the drawbacks identified in the literature of the state of the art by means of an economically efficient management system, free of maintenance and that can be easily used in residential and industrial applications.

SUMMARY

According to a first aspect of the present invention, a power management equipment is proposed to manage energy in a home or industrial grid which includes a housing comprising:
an electronic card;
a processor;
a data storage medium;
a data receiving/transmitting device;
a power supply;
an exit and control port;
The output and control port is connected to a power consumption source, a main power grid, an intermittent power source, a secondary power generation source and an energy storage device; containing said data storage medium:

an optimization program executable by the processor;
information on power generation profiles;
information on energy demand profiles;
The program and the profile information are received by the data receiving/sending device.

The power management equipment acts as a controller of the grid determining the energy flows that circulate through each of its components and optimally managing them for the benefit of the user.

Said equipment requires simple and low-cost storage and processing means, such as a memory, for example a flash memory whose sole function is to store the information on solar radiation profiles associated with the geographic location where the equipment is installed, as well as the optimization program that the processor contained in the housing will execute.

This configuration advantageously avoids having to rely on expensive state-of-the-art climate prediction and data processing equipment to perform calculations that optimize the microgrid. Instead, it is enough to program the software to run the pre-charged program on the data storage medium based on the information on solar radiation, energy demand and energy prices stored on the same data storage medium, allowing the final cost of the equipment to be low and therefore, it can be purchased by users and can be applicable for home purposes.

According to a second aspect of the present invention, an energy management system is proposed in a grid for home or industrial use which comprises:
a source of energy consumption;
a main power grid;
an intermittent power source;
a secondary source of power generation;
an energy storage device;
The system further comprises:
a scenario generator module configured to receive historical data obtained from the intermittent power source and to build power generation profiles;
a prediction module configured to receive energy demand data from the power consumption source and to estimate energy demand profiles;
an optimization module configured to manage the energy generated by the secondary source of power generation based on the profiles of energy generation and energy demand, as well as information on the prices of energy supplied by the main power grid; and
a control module consisting of a power management equipment as described above.

According to one embodiment of the invention, the scenario generator module is configured to generate a historical database and, on this basis, to learn new scenarios and build new profiles.

The proposed system can be easily applicable to a home or industrial grid that uses electrical energy from an interconnected system which also has the ability to generate energy from intermittent sources, such as solar radiation from photovoltaic panels, when there is storage capacity through for example, the use of batteries.

According to a third aspect of the present invention, a method is proposed to manage energy in a grid for home and industrial use wherein said method comprises the steps of:
1.1 receiving and storing in a control module power generation profiles constructed from historical data from an intermittent power source;
1.2 receiving and storing in the control module, energy demand profiles constructed from historical data obtained from the source of energy consumption;

1.3 receiving and storing in the control module, information on the prices of the energy supplied by a main power grid;

2.1 deciding based on the information obtained in the preceding stages and by means of an optimization model, the expected flows between the source of energy consumption, the main power grid, the intermittent power source, a source of generation of secondary energy and an energy storage device;

3.1 determining the energy effectively generated by the secondary energy generation source and compare it with the energy flows decided in the preceding stage;

3.2 injecting into the main power grid, the excess energy generated by the panels in case their flow has been underestimated in step 3.1;

3.3 obtaining from the main power grid, the energy deficit not generated by the panels in case its flow has been overestimated in step 3.1.

The proposed method allows to improve the traditional policies of energy management in grids for home and industrial use, considering additional variables and non-trivial decisions for the determination of energy flows, which allows the user significant savings in the purchase of energy and increase the efficiency of the system.

BRIEF DESCRIPTION OF THE DRAWINGS

As part of the present invention the following representative figures of the same are presented and, therefore, they should not be considered as limiting the definition of the claimed matter.

DETAILED DESCRIPTION

Figure 1:
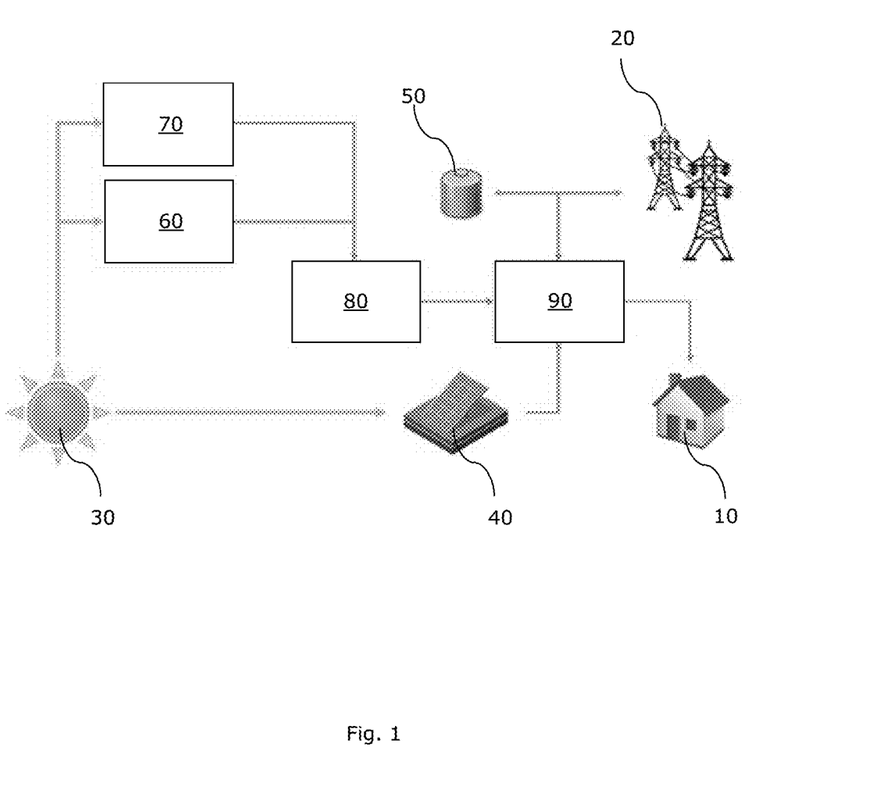
FIG. 1 shows a general diagram of the operation of the present invention.

According to the example illustrated in FIG. 1, a grid for home and industrial use according to the present invention comprises a source of energy consumption 10, a main power grid 20, an intermittent power source 30, a secondary source of power generation 40 and an energy storage device 50.

The source of energy consumption 10 is represented as a residential building, such as a house, an apartment, etc., but it can also be any source that consumes energy from the main power grid 20, the latter being preferably the interconnected system that supplies household electricity. On the other hand, the intermittent power source 30 is preferably solar radiation which is used in this case by the secondary source of power generation 40 preferably in the form of photovoltaic panels but it can be any other renewable energy source whereby it is possible to generate electrical energy therefrom, such as a wind, biomass, geothermal source, etc.

The energy storage device 50 is preferably one or more electric batteries, such as for example lithium-ion batteries with charging capacities suitable for the applications of corresponding use.

The system comprises a scenario generator module 60, which receives historical data on solar radiation obtained from the intermittent power source 30 and allows defining profiles or grouped solar radiation curves for each part of the year, building scenarios for the generation of energy and calculating its probability of occurrence.

The system also comprises a prediction module 70 which receives historical data on energy demand from the user and which learns through automatic learning methods (machine learning) to estimate energy demand (charge) profiles of the power consumption source 10 during the following days.

The radiation and demand profiles generated by modules 60 and 70 are used as input parameters by an optimization module 80 which considers these forecasts, as well as information on the prices of electrical energy supplied by the main power grid 20 to define the optimal management strategy of the energy generated by the secondary source of power generation 40. According to one embodiment of the invention, radiation profiles and especially demand profiles and price information can be periodically updated in time.

According to a preferred embodiment, the optimization module 80 uses two-stage stochastic programming (SP) to obtain the optimal operational energy policy in the grid. In the first stage it decides the energy flows between the main power grid 20, the secondary energy generation source 40, the demand of the power consumption source 10 and the energy storage device 50. This decision is preferably determined based on the radiation profiles generated by the scenario generator module 60.

In the second stage, the energy surplus or deficit is determined with respect to the expected energy flows and determined by the prediction module 70. For this, additional clearance variables are used which indicate whether the energy generated by the secondary source of power generation 40 was underestimated, in which case the excess power should be sold to the main power grid 20, or if it was overestimated in which case the user would have to buy power from the main power grid 20.

The objective of the stochastic programming model is to minimize the expected energy costs of the consumer while managing the use of the energy storage device 50 according to its storage capacity, its charging and discharging capacity, and the power demand of the power consumption source 10.

According to one embodiment of the invention, the stochastic optimization model defines a control target based on a predetermined time, preferably 30 minutes. Thus and depending on the parameters established by the user three modes of operation are established:

a) Normal mode: the objective of the optimization model is to minimize the expected costs.

b) Conservative mode: the objective of the optimization model is to minimize the cost of the worst case scenario.

c) Aggressive mode: the objective of the optimization model is to minimize the risk of not having power in high price ranges.

The results obtained by the optimization module 80 are delivered to a control module 90 which consists of a hardware that manages the energy and ensures that this is used by the source of energy consumption 10, it is stored in the energy storage device 50 or is sold/bought to/from the main power grid 20.

Figure 2:
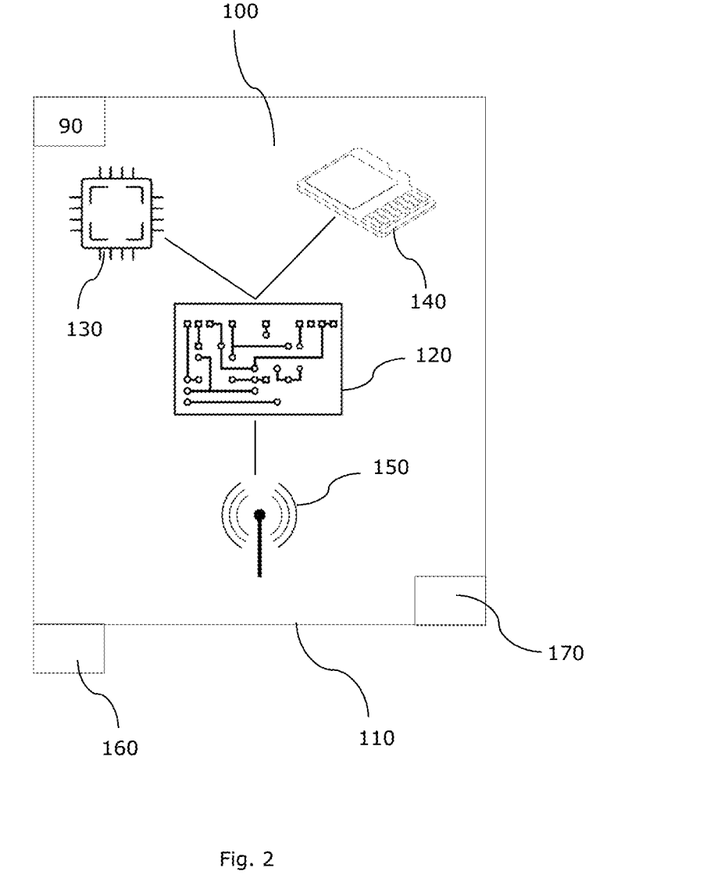
FIG. 2 illustrates a diagram of a home power management equipment according to the present invention.

According to one aspect of the invention, the control module 90 consists of a home power management equipment 100 which is represented in FIG. 2. The power management equipment 100 comprises a housing 110 resistant to outside conditions, preferably IP protocol 5 to 7, inside which an electronic card 120 (such as a PCB board), a processor 130, a data storage medium 140, a data receiver/transmitter device 150 and an output port 160, the latter providing a connection between the power management equipment 100 and the power meter of the power consumption source 10, this being for example, a bidirectional single-phase household meter. Said connection can be made, for example, by means of RS232/I2c communication protocols or others. Similarly, the control module is directly connected to the secondary power generation source and to the energy storage device.

Finally, the power management equipment 100 comprises a power supply 170 that can be a power port for the connection of an external energy source and/or comprise a battery inside the housing 110 (not illustrated) to supply the energy it requires for its operation.

According to a preferred embodiment of the invention, the data storage medium 140 consists of a flash memory containing data of the radiation profiles generated by the scenario generator module 60 and data of demand profiles generated by the prediction module 70. Said data is stored in the data storage medium 140 through the data receiving/sending device 150 and may be associated with data applicable to a particular time interval. For example, radiation and demand profiles data could be charged at the beginning of a year, in order for the power management equipment 100 to operate based on the previous year's energy consumption information. Therefore, said data can be periodically updated and charged to the data storage medium, being received by the data receiving/sending device 150 which can be a USB port, a Wi-Fi receiver/transmitter, a Bluetooth receiver/transmitter, among others.

On the other hand, the data storage medium 140 also stores the program of the optimization module 80 which is executed by the processor 130 on the electronic card 120. Preferably, the optimization module is programmed to make decisions on the energy flow one day before according to the predicted meteorological conditions and, once the solar radiation of the current day is known, the clearance variables are produced depending on whether the generation of the secondary source of power generation 40 was overestimated or underestimated.

Thus, considering that radiation and consumption behavior have a daily cycle, decisions are made day by day. For example, every day at midnight the optimization module 80 schedules the next day's power management based on the profiles charged on the data storage medium 140 and is divided into T time intervals, since for all days there are N possible scenarios. Each time interval has its own set of variables, parameters, and constraints.

Figure 3:
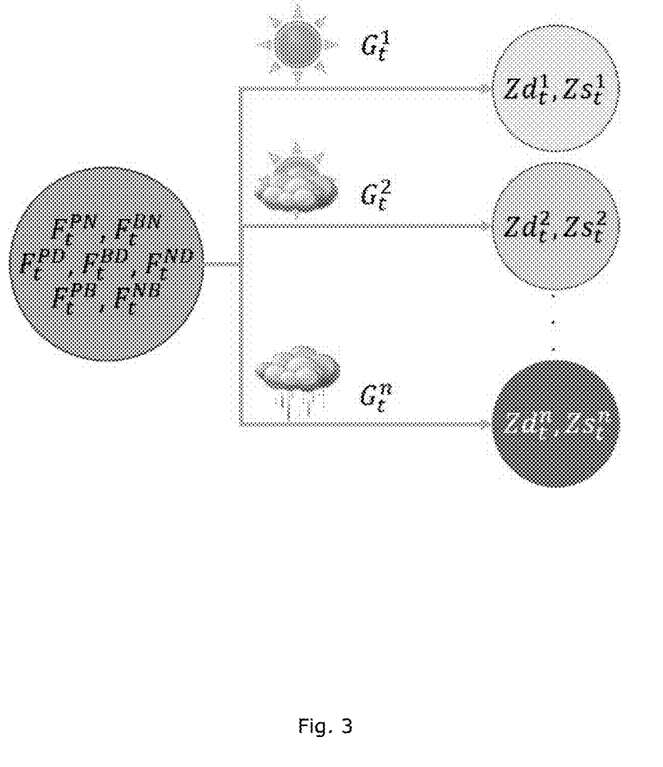
FIG. 3 shows a diagram of the optimization model and the variables used in the generation of scenarios.

FIG. 3 shows a basic example of a model that considers n possible scenarios, wherein the configuration of the proposed optimization problem is as follows:

At the beginning of the day, the model makes the following decisions for each hour on day t=1, . . . , 24:
How much energy the user uses from the intermittent power source ($F^{PD}_{nt}$), energy storage device ($F^{BD}_{nt}$) and the main power grid ($F^{ND}_{nt}$)
How much energy is delivered to the main power grid from the intermittent power source ($F^{PN}_{nt}$) and the energy storage device ($F^{BN}_{nt}$); and
How much energy is stored from the intermittent power source ($F^{PB}_{nt}$) and main power grid ($F^{NB}_{nt}$).

In order to model the uncertainty in the generation, as explained above, n different generation scenarios are assumed for the whole day when the scenario s has a generation of $G^S_1, \ldots, G^S_T$ for each time interval. Since the model has to deal with the uncertainty of power generation, additional clearance variables are considered to indicate whether the power generated by the intermittent power source was underestimated, in which case the excess power should be sent to the main power grid ($Z_{Snt}$), or overestimated in which case the user must use power from the main power grid ($Z_{dnt}$).

The objective of the optimization problem is to manage how to satisfy the demand according to the probabilities of the generation scenarios so that the expected return to the user is maximized. By selecting this target function, it is implicitly assumed that the end user is risk-neutral.

The following parameters are used:
T: Number of time intervals in a day.
E: Number of stages to consider.
p(n): Origin of node n.
$VS_t$: Energy sale price to the main power grid in the time interval t [$].
$VP_t$: purchase price of energy from the main power grid in the time interval t [$].
$P_n$: probability of occurrence of reaching node n.
Target Function.

$$\min \sum_{n \in n_E} P_n H_n$$

$P_n$ represents the probability of reaching node n and $H_n$, the cumulative expected cost with:

$$H_n = \sum_{t=1}^{T} C_{nt} + H_{p(n)}, \forall n = \{2, \ldots, N\}, H_1 = \sum_{t=1}^{T} C_{n1},$$

$C_{nt}$ represents the expected cost of node n in time interval t:

$$C_{nt} = \sum_{t=1}^{T} \left( VP_t \left( F^{ND}_{nt} + F^{NB}_{nt} \right) + (1 + \epsilon) Z d_{nt} - VS_t \left( F^{PN}_{nt} + F^{BN}_{nt} \right)(1 - \epsilon) Z_{snt} \right),$$

$$\forall n = \{2, \ldots, N\}.$$

According to the following restrictions:
User consumption restriction: the sum of the consumption variables in the time interval t must be equal to the quantity demanded by the user in the time interval t.

$$F^{PD}_{nt} + F^{ND}_{nt} + F^{BD}_{nt} = D_{nt}, \forall t, n = \{1, \ldots N-1\}$$

$D_{nt}$ is the amount of energy that the user must consume or demand at node n in the time interval t.

Generation restriction: the amount of energy that comes out from the intermittent power source must be equal to the amount of energy generated by the same at time t, given scenario s. Because $G^S_t$ is a random parameter, there will be as many constraints as there are scenarios for stage t.

$$F^{PD}_{p(n)t} + F^{BB}_{p(n)t} + F^{PN}_{p(n)t} - Z_{dnt} + Z_{snt} = G_{nt},$$
$$\forall t, n = \{2, \ldots, N\}$$

$G_{nt}$ represents the generation of energy from the intermittent power source at time t, given node n.

Energy storage device restriction: the amount of energy accumulated in the energy storage device until time t must be equal to the energy accumulated until time t−1 plus the energy stored during t, either from the intermittent power source or from the main power grid, minus what was extracted from the energy storage device, either to be consumed or to be injected into the main power grid.

$$B_{nt} = B_{n(t-1)} + \alpha(F_{nt}^{PB} + F_{nt}^{NB}) - (F_{nt}^{BN} + F_{nt}^{BD}),$$
$$\forall t-\{2, \ldots, T\}, n-\{1, \ldots, N-1\}$$

$$B_{n1} = B_{p(n)T} + \alpha(F_{n1}^{PB} + F_{n1}^{NB}) - (F_{n1}^{BN} + F_{n1}^{BD}),$$
$$\forall n-\{2, \ldots N-1\}$$

$$B_{11} = B_0 + \alpha(F_{11}^{PB} + F_{11}^{NB}) - (F_{11}^{BN} + F_{11}^{BD})$$

α is the efficiency of the energy storage device and $B_{nt}$ is the accumulated energy at time t.

Restriction of the capacity of the energy storage device: the amount of energy that is stored in the energy storage device, minus the energy extracted thereof, must be less than its capacity considering the accumulated energy stored in it up to time t.

$$B_{nt} \leq K, \forall t, n-\{1, \ldots, N-1\}$$

K is the maximum capacity parameter of the energy storage device.

Energy storage device charge restriction: the energy with which the energy storage device is charged must not be greater than its charging capacity:

$$F_{nt}^{PB} + F_{nt}^{NB} \leq Kc, \forall t, n-\{1, \ldots, N-1\}$$

Kc is the maximum charge capacity of the energy storage device.

Energy storage device discharge restriction: the energy with which the energy storage device is discharged must be less than or equal to the discharge capacity of the device.

$$F_{nt}^{BD} + F_{nt}^{BN} \leq Kd, \forall t, n-\{1, \ldots, N-1\}$$

$K_d$ is the maximum discharge capacity of the energy storage device.

EXAMPLE

A simulation example with scenarios generated for the application of the proposed energy management system is described below.

In the first place, daily solar radiation profiles or curves were determined for each month of any given year, which were obtained by the scenario generator module according to real historical data of the residential energy demand of Santiago de Chile and with historical data of meteorological information obtained by the Department of Geophysics of the University of Chile.

The solar radiation curves were grouped using the K-means algorithm to calculate an optimal number of clusters using the Davie-Bouldin Index (DBI). Six different groups were found where each one represents 2 months of the year for Santiago de Chile:

Group 1: January and December
Group 2: February and November
Group 3: March and October
Group 4: April and September
Group 5: May and August
Group 6: June and July At the end of each day and by means of the prediction module, the transition probabilities for the following day were identified. Then and by means of the optimization module, the SP was resolved to make the first decision regarding energy flows and once the uncertainty was revealed, the actual generation of that day and the decision to buy energy in the event of a deficit were verified, or whether to sell it in case of surpluses.

Figure 4A:
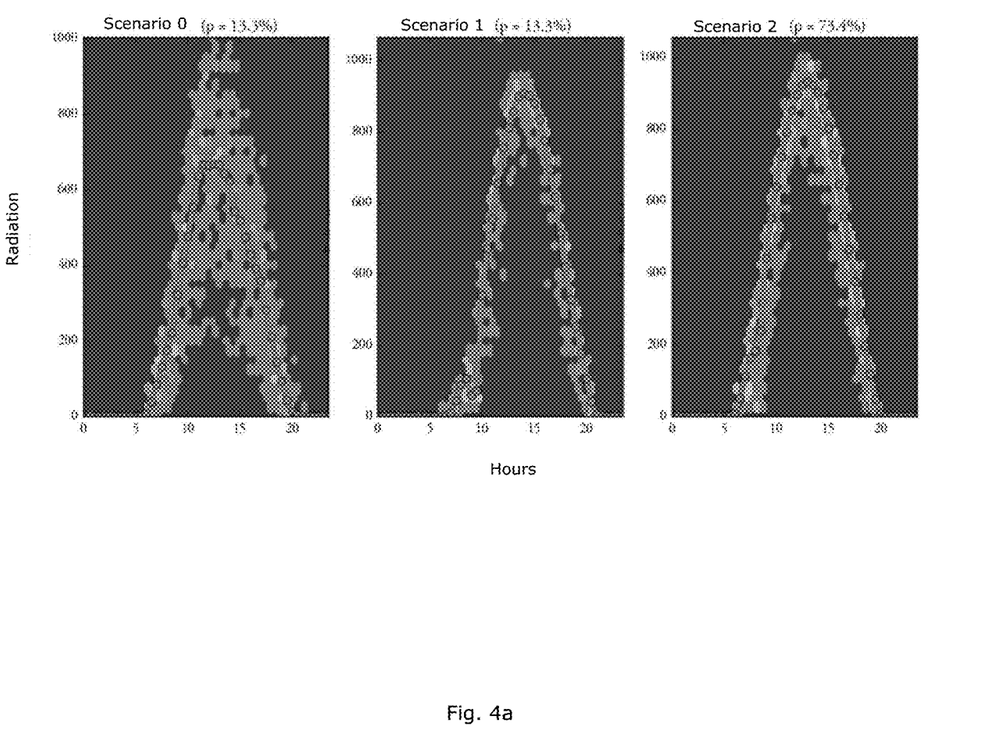
FIG. 4a shows examples of solar radiation scenarios generated by the scenario generator module of the present invention.

1,000 days were simulated for each month, generating random instances of solar radiation and demand, the results of which can be seen in FIG. 4a.

Figure 4B:
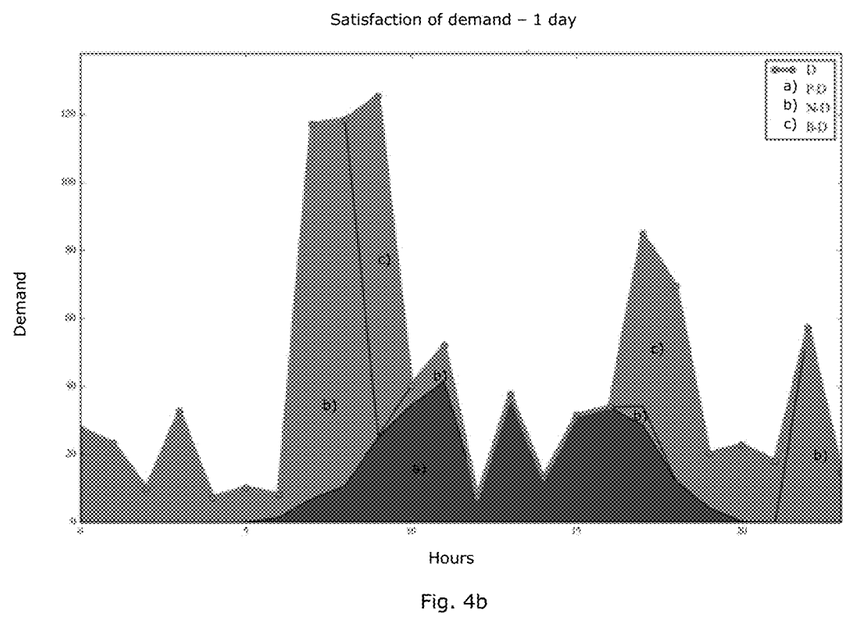
FIG. 4b shows an example of a full day demand profile generated by the prediction module.

FIG. 4b shows the customer demand as a line (D) and how to satisfy the demand under it. Area a) represents the energy that comes from the intermittent power source, which for example is produced during daylight hours, as said source corresponds to photovoltaic panels. Area b) represents the energy consumed from the main power grid. Finally, area c) represents the energy consumed from the energy storage device, which as expected occurs during periods when the price of energy is more expensive.

Figure 4C:
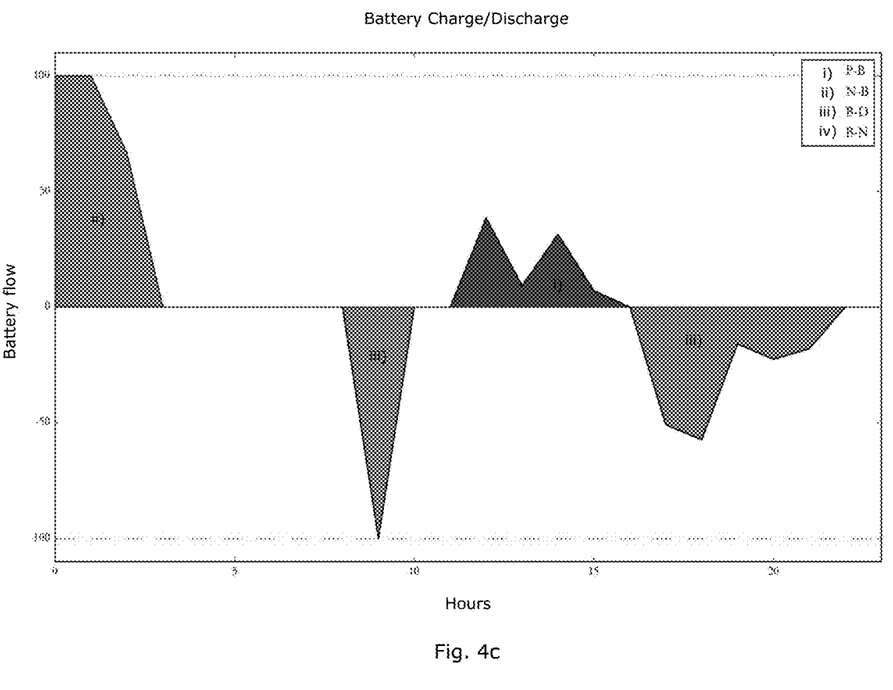
FIG. 4c illustrates an example of the charge and discharge cycles of the energy storage device during a full day.

FIG. 4c shows the flow to/from the energy storage device (battery). Area ii) represents the flow of stored energy from the main power grid (which is only during cheap energy hours). Area i) represents the stored energy flow from the intermittent power source (which is what is left over during the period of sunlight). Area iii) represents the flow of energy that is consumed from the battery by the main consumption source. Area iv) represents the flow of energy that is extracted from the battery and sold to the main power grid which in the illustrated example has a value of 0. Finally, the upper and lower dotted lines of the graph represent the maximum capacities of input and output of energy to the battery, where it is seen for example, that during the early morning the battery is charged to its maximum capacity.

To evaluate the performance of the proposed system, the model was compared with the traditional energy policy. This policy establishes that the demand must be satisfied with the energy generated by the secondary source of power generation with that stored in the energy storage device or with that purchased from the main power grid. If the energy generated from the energy storage device is not enough to satisfy the demand the energy stored in the latter is released. If the demand is still not satisfied, the missing power is purchased from the main power grid. On the other hand, when the energy generation of the energy storage device exceeds the demand, the reserve energy is stored in the latter or if it is at its maximum capacity the energy is injected into the main power grid for a sales compensation.

Figure 5A:
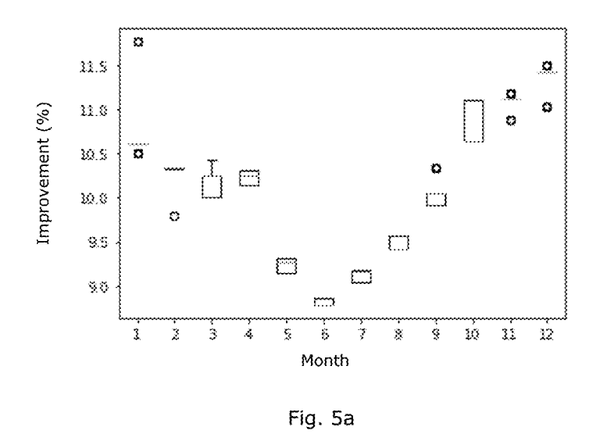
FIGS. 5a to 5c are graphs associated with the statistical results of the model proposed by the present invention.
Figure 5B:
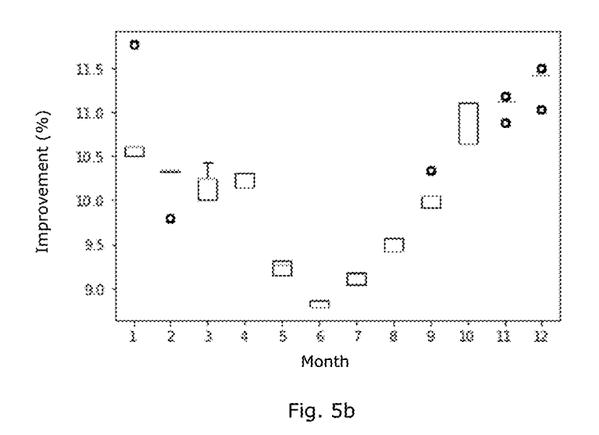

The performance of the model was measured as the expected cost of purchasing power in one day. When comparing the performance of the model with the traditional policy described above, the expected cost obtained was between 8.9% and 11.6% lower than the cost of said policy. The box graphs seen in FIGS. 5a and 5b represent the client's savings when using the proposed model in the different months of the year compared to the expected cost of the traditional policy when simulated with 100 and 1,000 experiments per day, respectively.

Figure 5C:
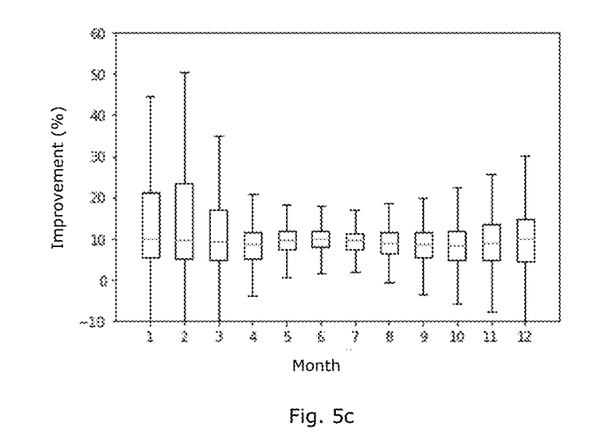

Finally, the model and the effectiveness of the simulation were tested by means of a historical validation. Given the real data on solar radiation, it was determined what the cost to the end user would have been when applying the model and the results showed a saving of 1.16%. FIG. 5c shows a graph illustrating the improvement results using actual data.

NUMERICAL REFERENCES

10 Power Consumption Source
20 Main power grid
30 Intermittent power source
40 Secondary source of power generation
50 Energy storage device
60 Scenario generator module
70 Prediction module
80 Optimization module
90 Control module
100 Power Management Equipment
110 Housing
120 Electronic card
130 Processor
140 Data storage medium
150 Data receiving/sending device
160 Output port

The invention claimed is:

1. A method for managing energy in a grid for home or industrial use, wherein it comprises an energy management system, wherein said method comprises the steps of:
　1.1 receiving and storing in a control module, power generation profiles constructed from historical data from an intermittent power source;
　1.2 receiving and storing in the control module, energy demand profiles constructed from historical data obtained from the energy consumption source;
　1.3 receiving and storing in the control module, information on prices of the energy supplied by a main energy grid;
　2.1 deciding based on the information obtained in the preceding stages and by means of an optimization model, the expected flows between the source of energy consumption, the main energy grid, the intermittent energy source, a secondary power generation source and an energy storage device;
　3.1 determining the energy effectively generated by the secondary energy generation source and compare it with the energy flows decided in the preceding stage;
　3.2 injecting into the main power grid, the excess energy generated by the panels in case their flow has been underestimated in step 3.1;
　3.3 obtaining from the main energy grid, the energy deficit not generated by the panels in case their flow has been overestimated in step 3.1,
　wherein the energy management system is an energy management system in a grid for residential or industrial use, wherein the energy management system comprises:
　　a source of energy consumption;
　　a main power grid;
　　an intermittent power source;
　　a secondary source of power generation;
　　an energy storage device;
　　a scenario generator module configured to receive historical data obtained from the intermittent power source and to construct power generation profiles;
　　a prediction module configured to receive energy demand data from the energy consumption source and to estimate energy demand profiles;
　　an optimization module configured to manage the energy generated by the secondary source of energy generation, based on the profiles of energy generation and energy demand, as well as information on the prices of the energy supplied by the main power grid; and
　　a control module consisting of an energy management equipment, and
　wherein the energy management equipment is an energy management equipment to manage energy in a grid for home or industrial use, which includes a housing, wherein the energy management equipment comprises:
　　an electronic card;
　　a processor;
　　a data storage medium;
　　a data receiving/transmitting device;
　　a power supply; and
　　an output port;
　wherein said output port is connected to a power consumption source, a main power grid, an intermittent power source, a secondary power generation source and an energy storage device; containing said data storage medium:
　　an optimization program executable by the processor;
　　information on power generation profiles;
　　information on energy demand profiles;
　wherein the program, the power generation profile information, and the energy demand profile information are received by the data receiving/sending device.

2. The method according to claim 1, wherein the data storage medium is a memory.

3. The method according to claim 1, wherein the data receiving/transmitting device is selected from the group of a USB port, a Wi-Fi receiver/transmitter, and a Bluetooth receiver/transmitter.

4. The method according to claim 1, wherein the housing also comprises a battery.

5. The method according to claim 1, wherein the scenario generator module is configured to generate a historical database and on this basis to learn new scenarios and build new profiles.

6. The method according to claim 1, wherein the source of energy consumption is a residential building.

7. The method according to claim 1, wherein the main power grid is an interconnected system that supplies home electricity.

8. The method according to claim 1, wherein the intermittent energy source is solar radiation.

9. The method according to claim 1, wherein the secondary source of power generation consists of photovoltaic panels.

10. The method according to claim 1, wherein the energy storage device is one or more electric batteries.

11. The method according to claim 1, wherein the optimization model is a stochastic programming model (SP).

12. The method according to claim 1, wherein steps 1.1 to 1.3 are periodically updated.

13. The method according to claim 1, wherein the optimization model comprises managing the use of the energy storage device according to its storage capacity and its loading and unloading capacity.

14. The method according to claim 1, wherein the optimization model comprises managing the energy demand of the energy consumption source.

15. The method according to claim 1, wherein the decisions of step 2.1 are made daily.

16. The method according to claim 1, wherein the optimization model defines a control objective based on a determined time.

17. The method according to claim 16, wherein the optimization model aims to minimize the expected costs.

18. The method according to claim 16, wherein the optimization model aims to minimize the cost of the worst case scenario.

19. The method according to claim 16, wherein the optimization model aims to minimize the risk of not having energy in high price ranges.

* * * * *